(12) United States Patent
Coates et al.

(10) Patent No.: US 7,590,553 B2
(45) Date of Patent: Sep. 15, 2009

(54) INTEGRATED SPATIAL VIEW OF TIME, LOCATION, AND EVENT SCHEDULE INFORMATION

(75) Inventors: Justine Coates, White Rock (CA); Timothy Sharpe, Redmond, WA (US); Jeffrey D. Morris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

(21) Appl. No.: 10/694,292

(22) Filed: Oct. 27, 2003

(65) Prior Publication Data

US 2005/0091096 A1    Apr. 28, 2005

(51) Int. Cl.
*G04B 19/24* (2006.01)
(52) U.S. Cl. .................. 705/8; 368/28; 368/89
(58) Field of Classification Search ............ 705/8; 368/28, 89
See application file for complete search history.

(56) References Cited

U.S. PATENT DOCUMENTS

| | | | | |
|---|---|---|---|---|
| 5,271,172 | A * | 12/1993 | Ureta | 40/107 |
| 5,790,974 | A * | 8/1998 | Tognazzini | 455/456.5 |
| 6,266,295 | B1 * | 7/2001 | Parker et al. | 368/28 |
| 6,321,158 | B1 * | 11/2001 | DeLorme et al. | 701/201 |
| 6,336,072 | B1 * | 1/2002 | Takayama et al. | 701/200 |
| 6,601,988 | B2 | 8/2003 | Molander | |
| 6,925,603 | B1 * | 8/2005 | Naito et al. | 715/733 |
| 6,944,539 | B2 * | 9/2005 | Yamada et al. | 701/211 |
| 7,256,711 | B2 * | 8/2007 | Sheha et al. | 340/995.1 |
| 7,274,375 | B1 * | 9/2007 | David | 345/619 |
| 2003/0200192 | A1 * | 10/2003 | Bell et al. | 707/1 |
| 2004/0124977 | A1 * | 7/2004 | Biffar | 340/539.13 |
| 2004/0225966 | A1 * | 11/2004 | Besharat et al. | 715/705 |

OTHER PUBLICATIONS

Springfield Bus Route Service, accessed at www.cityutilities.net/services/ser_route.htm via the Wayback machine at www.archive.org on Nov. 5, 2002.*
Dragicevic, Pierre and Stephane Huot. "SpireClock: A Continuous and Non-Intrusive Display for Upcoming Events." CHI 2002 Conference on Human Factors in Computer Systems (Apr. 2002).*

* cited by examiner

*Primary Examiner*—Beth V Boswell
*Assistant Examiner*—Neil R Kardos
(74) *Attorney, Agent, or Firm*—Lee & Hayes, PLLC

(57) ABSTRACT

Systems and methods integrate various types of scheduling information to create a single spatial view of a schedule. The spatial view enables observation of one's schedule at a glance and reduces the need for accessing additional information from other sources in order to comprehend scheduling information. Thus, users can access information regarding the time, location, and subject matter of appointments and/or events in a single location without the hassle of looking back and forth between various information sources. This helps users meet their scheduled appointments and events in an on-time and prepared manner.

9 Claims, 16 Drawing Sheets

300

Calendar View

400

Spatial View

INTEGRATED SPATIAL VIEW OF TIME, LOCATION, AND EVENT SCHEDULE INFORMATION

TECHNICAL FIELD

The present disclosure relates to schedules, and more particularly, to a way of integrating event times, event locations, and event information into a single spatial view on a map.

BACKGROUND

Various scheduling tools, such as scheduling applications available for use on small hand-held computer devices, for example, are intended to assist users in keeping track of information regarding appointment times, appointment locations, and other information related to the topic and substance of such appointments. The scheduling information might be thought of as being dynamic, since it is often changing day by day or even moment by moment depending on a user's level of appointment activity. Other scheduling tools, such as a bus schedule, for example, provide information that is more consistent from day to day. For example, a bus schedule includes weekday bus routes that remain the same each day during the week. The typical daily schedule might change during heavy and light use periods, such as rush hour and non-rush hour periods. There is also usually a weekend schedule for most bus routes as well. Other than these changes, such schedules can remain relatively unchanged for months or years. Thus, the scheduling information in such schedules might be thought of as being static, as it tends to change very little.

A problem with many active scheduling tools (e.g., applications for use on a hand-held computer device) and passive scheduling tools (e.g., a bus schedule), however, is that they present scheduling information, such as appointment/event locations, times, and other related information in a manner that requires a user to consult two or more information sources in order to determine the desired information from the schedule. For example, with most scheduling applications available for hand-held computer devices, a user can review appointment information as a text list in a calendar view. If a user has a number of appointments throughout the day, the calendar view of the appointment information might list the title, time, and location of the appointments one after another. A user is then required to consult further information sources in order to understand where to be and when to be there to satisfy the scheduled appointments.

For example, the user may have to first consult the calendar view of the information to determine the time and location of an appointment. Then the user might consult a clock or watch to determine the present time. While checking the time the user may need to consult a map by accessing an online map source, for example, such as Yahoo Maps, in order to determine how best to navigate to the upcoming appointment considering the present time and the start time of the appointment. The need to access all of this information while in a hurry to make the scheduled appointment presents a less than desirable scenario for most users.

Other types of schedules, such as bus schedules or other types of mass transit schedules, present similar difficulties. For example, one embodiment of a bus schedule for a single bus route includes a large table of bus departure times organized from left to right and top to bottom according to bus stop locations listed across the top row of the table. A map of the bus route is also illustrated. To determine when the next available bus is departing from a particular bus stop location, a user must check the present time from a clock or watch. Then the user must consult the table of information to determine the operable hours of service for the desired bus route. Assuming the bus route is in service at the time, the user must determine his or her present bus stop location by consulting the illustrated bus route map. Then the user can consult the table of departure times for that bus route to find the next closest time when a bus will be departing from the bus stop. The user needs to find one small number in a sea of numbers within the large table of bus departure times. For users unfamiliar with riding a bus, or using other mass transit services, determining how to utilize the schedules for such services can be a difficult and discouraging experience.

Accordingly, a need exists for a way to access and organize scheduling information for appointments or events in a manner that provides the pertinent information in a single view without requiring the use of as many peripheral information sources.

SUMMARY

A spatial view of scheduling information integrates appointment/event times, locations, and substantive information for display on a map.

In accordance with one implementation, a computer receives scheduling information including event times, event information, and event locations. Based on the event locations, the computer accesses a map. The computer integrates the event times, event information, and event locations into a schedule route on the map, such that the route designates the event locations using their corresponding event times. The event times are linked to underlying event information. The computer provides the schedule route on the map in a single spatial view that includes the event times, event information, and event locations.

In accordance with another implementation, multiple event times are presented in a single location via a modified analog clock face. The clock face includes an AM ring indicating active AM hours during which an event can occur. The clock face includes a PM ring indicating active PM hours during which an event can occur. The clock face includes one or more event indicator hands, each indicating a minute in each of the active AM hours and active PM hours when an event will begin.

BRIEF DESCRIPTION OF THE DRAWINGS

The same reference numerals are used throughout the drawings to reference like components and features.

DETAILED DESCRIPTION

Overview

The following discussion is directed to systems and methods that integrate various types of scheduling information to create a single spatial view of a schedule. The spatial view enables observation of one's schedule at a glance and reduces the need for accessing additional information from other sources in order to comprehend scheduling information. Thus, users can access information regarding the time, location, and subject matter of appointments and/or events in a single location without the hassle of looking back and forth between various information sources. This helps users meet their scheduled appointments and events in an on-time and prepared manner.

Exemplary Environment

Figure 1:
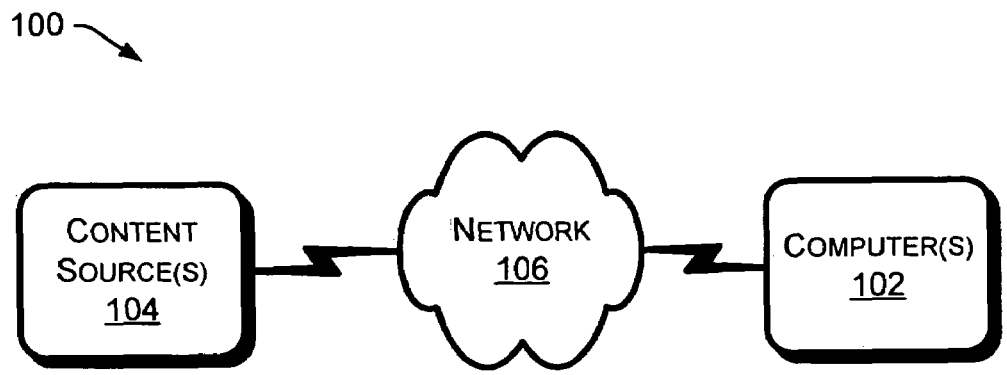
FIG. 1 illustrates an exemplary environment suitable for providing an integrated spatial view of schedule information.

FIG. 1 shows an exemplary environment 100 suitable for providing an integrated spatial view of scheduling information on a computer device. The exemplary environment can include computer(s) 102 of various types, and one or more content sources 104. Computer 102 is operatively coupled at various times to content source(s) 104 through a network 106. Network 106 can include both local and remote connections depending on the particular system configuration. Thus, network 106 may include, for example, any one or a combination of a modem, a cable modem, a LAN (local area network), a WAN (wide area network), an intranet, the Internet, or any other suitable communication link.

Content source 104 is implemented as one or more server computers such as a Web server. Thus, content source 104 may include a variety of general purpose computing devices such as a workstation computer, and may be configured in a manner similar to an exemplary implementation of computer 102, such as that described below with reference to FIG. 15. Content source 104 provides storage for electronic documents and information including various multi-media content that is accessible to client computers such as computer 102 over network 106. More specifically, content source 104 offers an online database service that provides maps and other geographic information to a computer 102 for a wide variety of geographical locations throughout the world. The content source 104 can provide, for example, local, regional, national, and international maps and geographic information. Maps can include various types of maps, including, for example, maps containing illustrations of city, state, and national roadway and other transportation systems. Examples of content sources 104 that provide maps and other geographic information include Yahoo! Maps at http://maps.yahoo.com/ and Microsoft® MapPoint® Technology at http://mappoint.msn.com/.

Computer 102 retrieves maps and other geographic information from a content source 104 for display on a display screen of the computer 102 in conjunction with other scheduling information, as further discussed below. Computer 102 is otherwise capable of performing common computing functions, such as email, calendaring, task organization, word processing, Web browsing, and so on. Computer 102 may run an open platform operating system, such as the Windows® operating systems from Microsoft®. Computer 102 may be implemented, for example, as a desktop computer, a server computer, a laptop computer, or other form of personal computer (PC).

In the embodiments described below, computer 102 is discussed as being implemented as a hand-held computer device such as, for example, a cell phone or a PDA (personal digital assistant; e.g., devices running Microsoft®'s PocketPC, Hewlett-Packard's Palmtop, 3Com's PalmPilot, etc.). In addition, computer 102 is intended to include various converged device solutions in which, for example, a desktop computer is a primary environment for creating/editing/viewing spatial and calendar appointment schedules and for performing other tasks, and where hand-held/mobile computer devices can be synchronized with the desktop computer. Such hand-held devices provide more limited computing capabilities than a typical personal computer, such as information storage and retrieval capabilities for personal or business use, including keeping schedule calendars and address book information. Such devices usually offer some version of an operating system such as Windows CE, while various applications are available that provide limited functionality compared to full-fledged versions available for typical personal computers. Thus, a computer 102 implemented as a hand-held mobile computer may include limited versions of email, phone, SMS (short message service), organizer and Web applications.

Exemplary Embodiments

Figure 2:
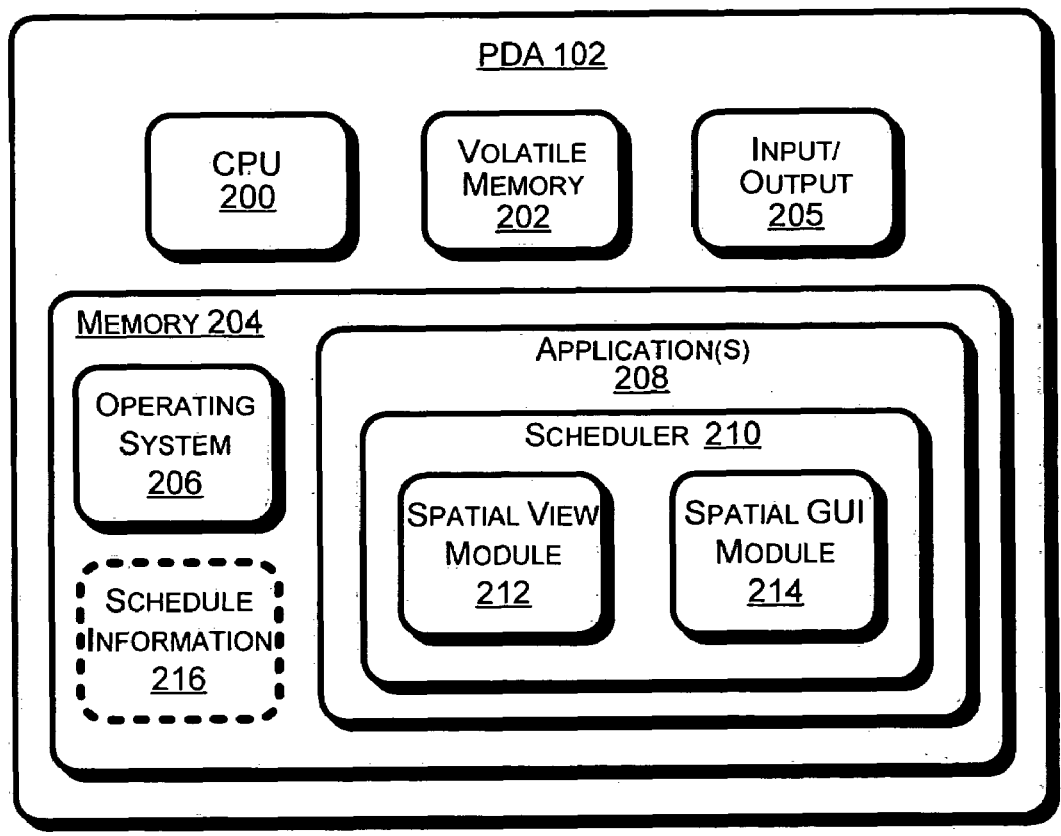
FIG. 2 illustrates an exemplary embodiment of a computer suitable for providing an integrated spatial view of schedule information.

FIG. 2 is a block diagram representation of an exemplary embodiment of a computer 102 that is configured to provide an integrated spatial view of scheduling information. Computer 102 is implemented as a PDA 102 (personal digital assistant) in the exemplary embodiment of FIG. 2.

PDA 102 includes a processor 200, a volatile memory 202 (i.e., RAM), and a nonvolatile memory 204 (e.g., ROM, hard disk, floppy disk, CD-ROM, etc.). Nonvolatile memory 204 provides storage of computer/processor-readable instructions, data structures, program modules and other data for PDA 102. PDA 102 may also include various input/output devices 205. Input device 205 examples (not shown) can include a track ball for moving a cursor and making selections, a stylus pen for making input selections on a touch-sensitive screen displaying soft buttons of a GUI (graphical user interface), hard buttons on the PDA 102 structure, and so on. Output device 205 examples (not shown) can include a display screen and an audio speaker.

PDA 102 implements an operating system (OS) 206 on processor 200 from volatile memory 202. OS 206 is stored in memory 204 and initially loaded from memory 204 into volatile memory 202 by a boot program (not shown). OS 206 is configured to manage other application programs 208 that are also stored in memory 204 and executable on processor 200 from volatile memory 202. OS 206 honors requests for services made by application programs 208 through predefined application program interfaces (APIs). More specifically, OS 206 determines the order in which multiple applications 208 execute on processor 200 and the execution time allotted for each application 208. OS 206 additionally manages the sharing of memory 202 among multiple applications 208, and handles input and output to and from attached hardware devices (e.g., hard disks, printers, dial-up ports). In addition, users can interact directly with OS 206 through a user interface such as a command language or graphical user interface.

PDA 102 implements various application programs 208 stored in memory 204 and executable on processor 200. Such applications 208 might include software programs implementing, for example, word processors, spreadsheets, browsers, file share programs, database management systems (DBMS), peer-to-peer applications, multimedia players, computer-aided design tools and the like. One application program 208 specifically illustrated in FIG. 2, is a scheduler application 210. Scheduler 210 is shown as including a spatial view module 212 and a spatial GUI (graphical user interface) module 214. Although modules 212 and 214 are illustrated as being part of application 210, it is noted that such modules might also function as stand-alone modules stored in memory 204 and executable on processor 200. In general, scheduler 210 is illustrated within applications 208, and modules 212 and 214 are illustrated as part of scheduler 210, for the purposes of discussion only rather than by way of any limitation.

Scheduler 210 is configured to perform appointment/event (referred to hereinafter as "event") scheduling tasks. For example, scheduler 210 provides for the input, storage, and retrieval of scheduling information 216 for personal or business-related events that a user wants to attend or keep track of. Scheduler 210 also may keep schedule calendars and address book information. Scheduling information 216 includes event times, event locations, and event subject matter (e.g., topics, attendees, notes, data files, etc.) related to such events. In general, and as discussed more below, scheduler 210 is configured to manipulate and present (i.e., via a display screen) such schedule information in various ways through spatial view module 212 and spatial GUI module 214.

Figure 3:
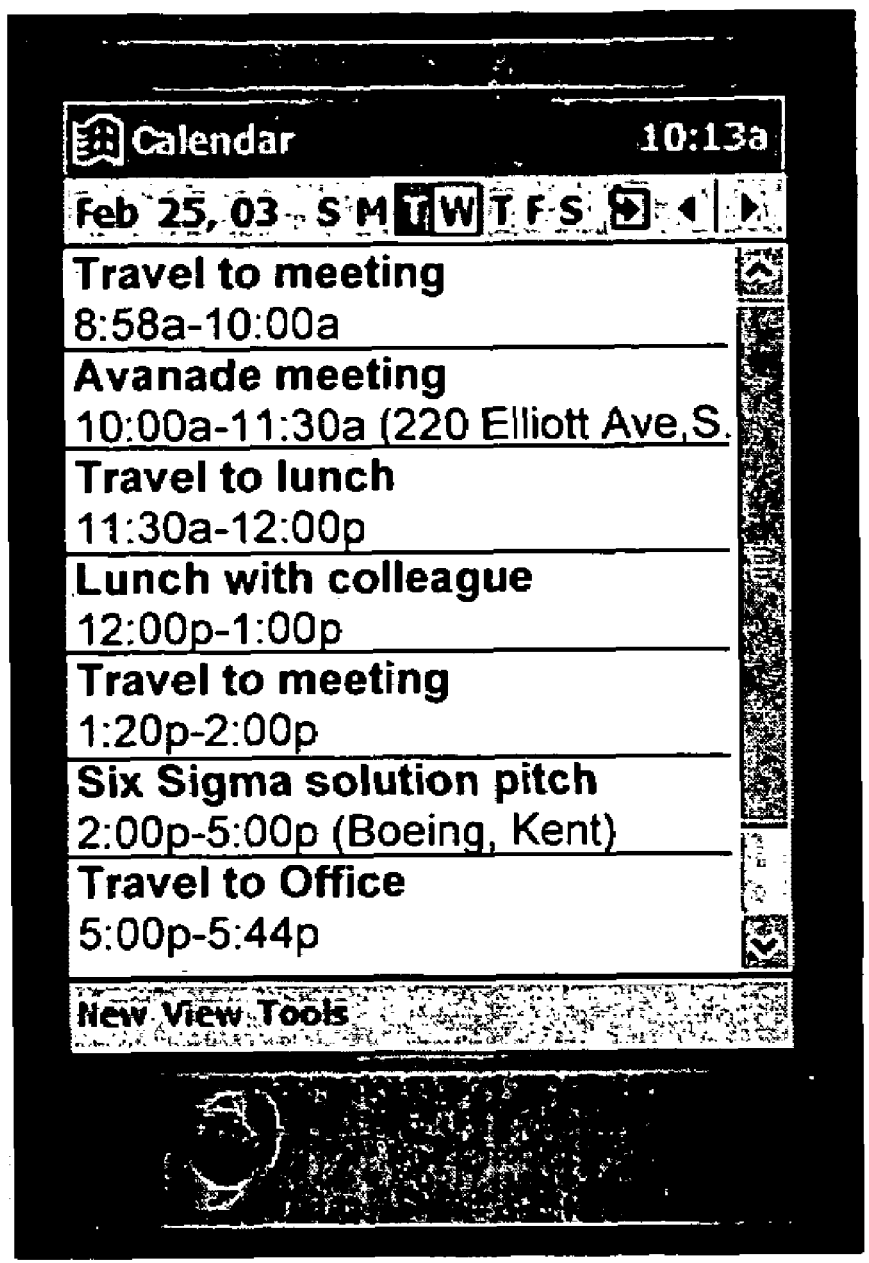
FIG. 3 illustrates one embodiment of a calendar view of schedule information.

FIG. 3 illustrates one embodiment of a calendar view 300 of scheduling information 216 that a user might enter into a scheduler 210 executing on PDA 102. Scheduler 210 presents the scheduling information 216 on the display screen of PDA 102 in one embodiment of a calendar view 300 that includes a list of event topics, event times, and event locations. Additional event information may be available for various event topics in the list. Such additional information is accessible in a calendar view 300 through initiation of a user input selection. Input selections may be made via hard buttons on the PDA 102 device or via a GUI supported by scheduler 210 and presented on the display screen of PDA 102. GUI inputs may be implemented, for example, as cursor-selectable inputs or as soft key inputs on a touch-sensitive display screen of PDA 102.

Figure 4:
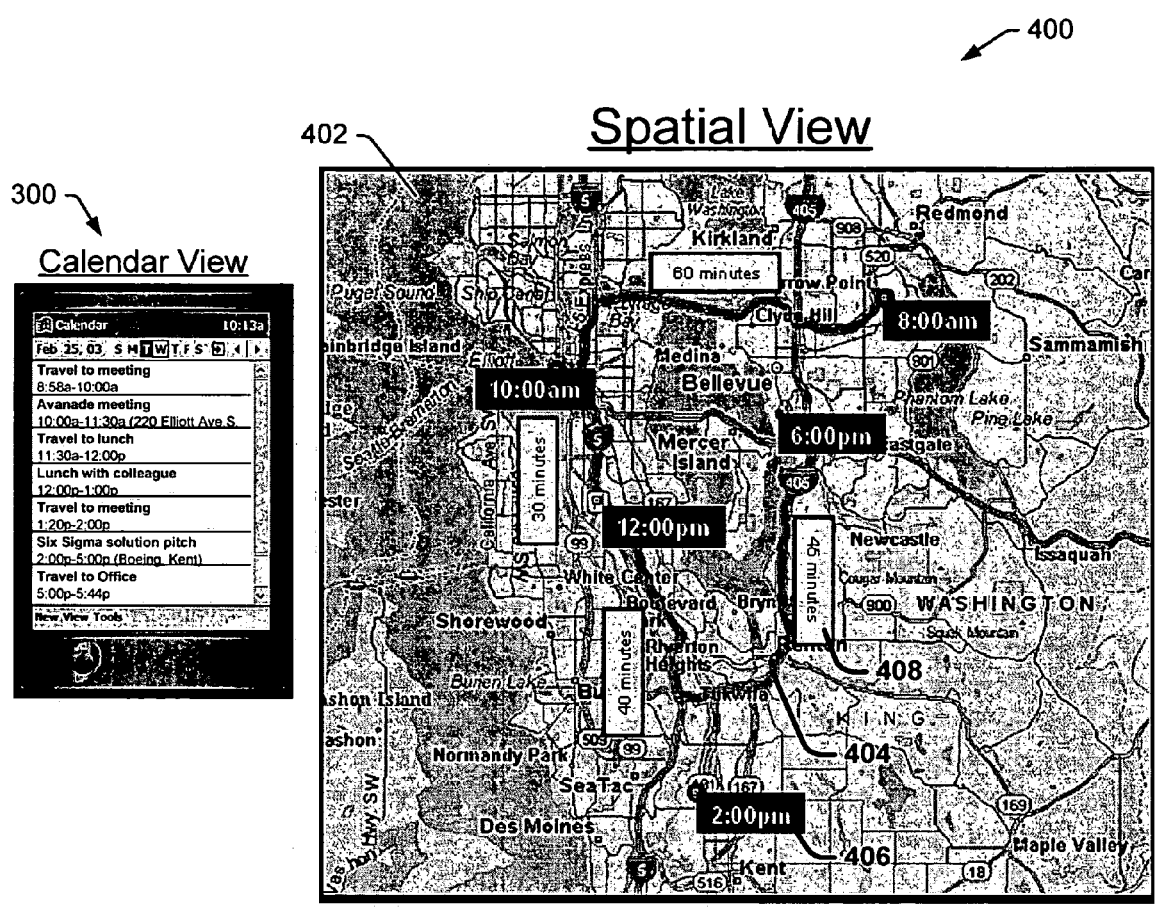
FIG. 4 illustrates an exemplary integrated spatial view of event times, locations, and general event schedule information integrated from scheduling information within a calendar view.

Spatial view module 212 (FIG. 2) is configured to manipulate scheduling information 216 and present a spatial view of the information. FIG. 4 illustrates an exemplary representation of an integrated spatial view 400 of time, location, and general event schedules from scheduling information 216 in calendar view 300. Spatial view 400 of scheduling information 216 includes the use of a map 402. Spatial view module 212 is configured to examine event location information within the scheduling information 216 and to access a map 402 that encompasses all of the event locations. Accessing map 402 may entail checking a local memory on PDA 102, such as memory 204, to determine if an appropriate map 402 has been previously stored. If there is not an appropriate map 402 available locally on the PDA 102, then spatial view module 212 initiates a network connection to a content source 104 that offers an online database service that provides maps and other geographic information. Spatial view module 212 makes a request to the content source 104 for the appropriate map or maps that correspond to the event location information. Depending on the event locations, such maps may include one or a combination of local maps, regional maps, national maps, and international maps. Once an appropriate map is found, spatial view module 212 downloads and stores the map locally on the PDA 102.

Once the spatial view module 212 has accessed the appropriate map or maps (e.g., map 402), it integrates the various components of scheduling information 216 (e.g., event times, event locations, event information) and the appropriate map(s) to generate a suggested travel route that a user should take in order to meet the scheduled events indicated by the scheduling information 216. Spatial view module 212 and spatial GUI module 214 then communicate to present a spatial view 400 of scheduling information 216 integrated into a map and displayed on a display screen of PDA 102.

As shown in FIG. 4, spatial view 400 of schedule information 216 includes a highlighted travel route 404 between each event location 406 in a schedule. Event locations 406 are designated by the time the event is scheduled to begin. There is an event time 406 illustrated at a geographic location on map 402 corresponding with each event location 406. The event times of FIG. 4 are illustrated as digital clock numbers. However, as discussed further below, event times and locations may also be represented by an analog clock face.

During the integration of schedule information 216, spatial view module 212 may perform various manipulations and calculations with respect to event times and locations that can provide additional useful scheduling information for display in a spatial view 400. For example, between each of the event locations 406 shown in FIG. 4, spatial view module 212 has provided travel time indications 408 to inform the user of the estimated time it will take to travel between each event location in the schedule.

In another embodiment, spatial GUI module 214 provides a user-selectable route optimization option (e.g., via an input 205) which, when selected, initiates a route optimization function of spatial view module 212. The route optimization function of spatial view module 212 accesses relevant traffic information and optimizes the travel route 404 displayed between each event location 406 according to the traffic information. Spatial view module 212 may access static traffic information from a local storage on the PDA 102, or it can access dynamic traffic information from a content server 104. Static traffic information is general traffic information about a particular geographical area that might indicate, for example, that between the hours of 4 PM and 7 PM, the traffic is normally slow on Interstate 5 between certain interchanges. Dynamic traffic information is more up-to-date information that may indicate specific traffic conditions at a particular moment. Upon accessing relevant traffic information, spatial view module 212 makes travel time calculations between event locations 406 and determines if travel route 404 can be optimized. If so, an optimized travel route 404 is displayed for the user, and the travel time indications 408 are updated to reflect new estimates for travel times between each event location 406.

In another embodiment, spatial GUI module 214 provides a user-selectable zoom option (e.g., via an input 205) which, when selected, initiates an event location zoom function of spatial view module 212. The zoom function permits a zoom up and zoom down option, and operates according to the nature of schedule information 216. For example, if schedule information 216 includes event locations 406 that include both local and national locations, then the zoom function will permit a user to zoom up from a spatial view of a local schedule of events to a spatial view of the national schedule of events. Thus, the zoom function permits zooming up and down between spatial views that include event locations that are dispersed throughout both specific (e.g., a narrow or local range) and general (e.g., wide ranging) geographic regions.

Figure 5:
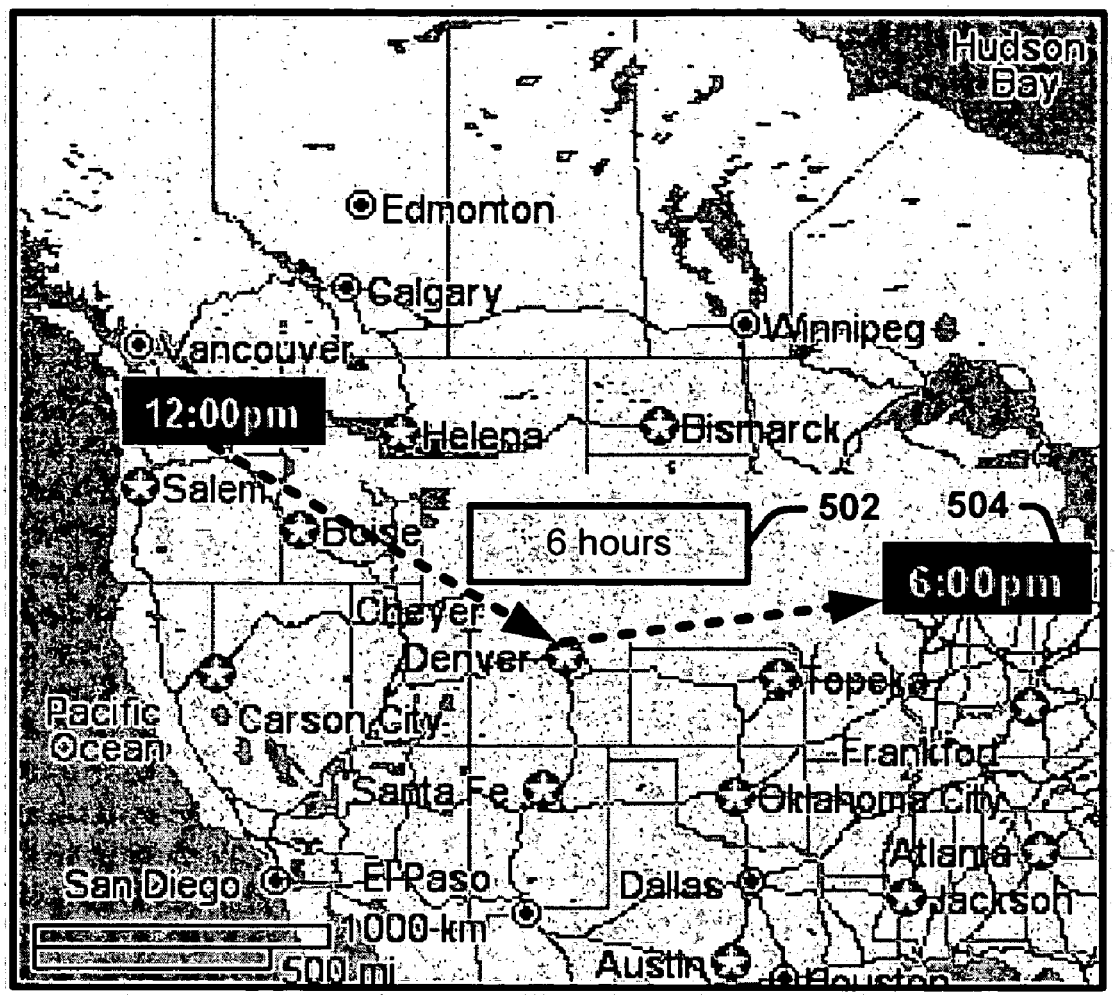
FIG. 5 illustrates an exemplary integrated spatial view of event times, locations, and general event schedule information on a national level zoomed up from a local integrated spatial view.

FIG. 5 illustrates an example of an integrated spatial view 500 showing time, location, and general event schedule information on a national level that has been zoomed up from a local integrated spatial view such as the local integrated spatial view 400 shown in FIG. 4. Like the local spatial view 400, the national spatial view 500 illustrates an approximate travel time 502 (e.g., the 6 hour trip by airplane via Denver) between event locations 504 in Seattle and Chicago. To return to the local spatial view 400 of the Seattle area, or to view a local spatial view of Chicago, the zoom function of spatial view module 212 permits a user to select the event location at Seattle and Chicago, respectively, which will zoom the spatial view back to a local view.

Figure 6:
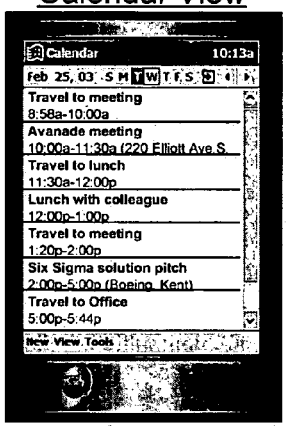
FIG. 6 illustrates an exemplary integrated spatial view of event times, locations, and general event schedule information with various information pop-ups activated.
Figure 6:
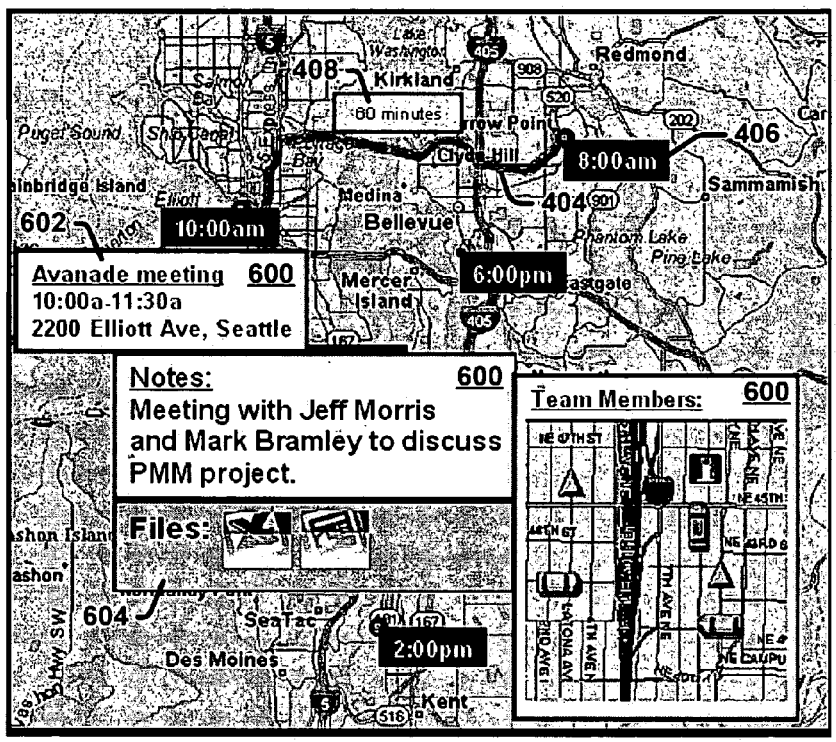

FIG. 6 illustrates an exemplary integrated spatial view 400 of event times, locations, and general event schedule information where various information pop-ups 600 are activated. Another function that the spatial view module 212 performs in concert with the spatial GUI module 214 is to provide user interactivity with schedule information 216 presented within spatial view 400. Event locations 406 (designated by event times 406) include additional underlying event information that is displayed by the spatial GUI module 214 upon user activation. The additional event information is displayed via information pop-up boxes 600. Pop-ups 600 may be activated, for example, by a user hovering a cursor over the corresponding event location 406. Thus, as shown in FIG. 6, if a user hovers a cursor over event location 406 indicated by the "10:00 am" event time, additional event information is shown to the user via pop-up 602. Additional pop-ups containing other information may also appear if the user continues to hover the cursor over the event location. For example, pop-up 604 includes meeting notes in addition to document files (i.e., illustrated by Excel and PowerPoint icons in the pop-up 604). Pop-up 604 makes such document files available to the user. Thus, the user can open, copy, send, and perform other typical operations on document files that appear within information pop-ups 600.

The information pop-ups 600 can also be selected by a user, permitting the user to edit their content. Once a pop-up 600 is displayed by hovering over the event locator 406, the pop-up may be selected by the user (e.g., by clicking on the pop-up 600). A user can then enter the pop-up in an edit mode where content can be added, deleted, and edited. Such content changes may also alter the schedule information 216. Thus, altered schedule information 216 from spatial view 400 will transfer from spatial view 400 to calendar view 300.

Figure 7:
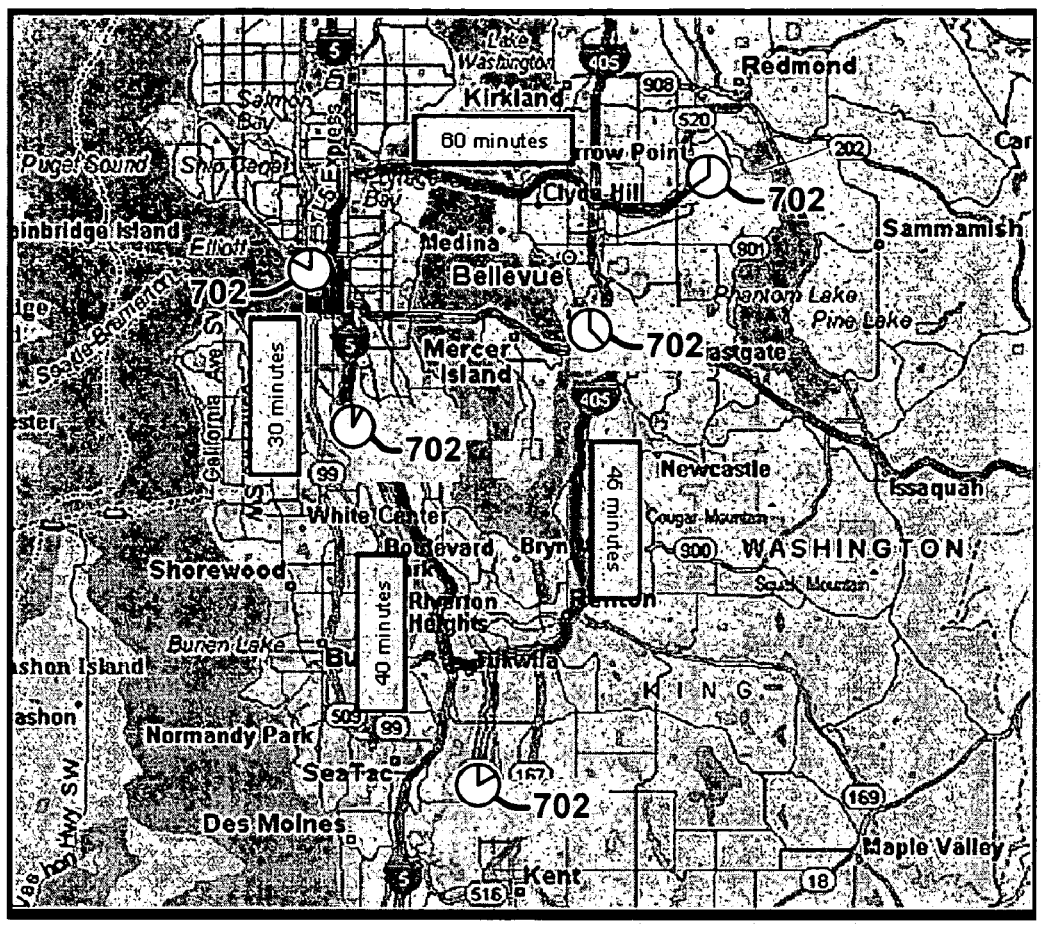
FIG. 7 illustrates an exemplary integrated spatial view of event time, location, and general event schedule information with event times and locations designated by simplified analog clock faces.

FIG. 7 illustrates an example of an integrated spatial view 700 of event time, location, and general event schedule information where the event times and locations 702 are designated by simplified analog clock faces. FIG. 7 is intended to show a typical day of appointments where analog clock faces mark the appointment locations on a map as well as indicating the times for those appointment times. Thus, map markers (e.g., map points or dots) typically used to mark locations on a map can be replaced with clock faces that are generally recognizable by most users. In this respect, the use of analog clock faces in this manner transcends languages because such clock faces are recognizable on a world-wide basis. Thus, an appointment map displayed in the French language could display appointment locations and times using the same analog clock faces as would be used for an appointment map displayed in the English language. It is also noted that Representing event times 702 in this manner allows a user to gather more information with a quick glance of the spatial view 700. For example, an event location 702 designated with an analog clock face can quickly convey both the time and location of the event at a glance without the need to read the time or location name.

In other embodiments, analog clock faces can convey additional information based on background colors of the clock faces. For example, an orange clock face may be useful to quickly convey that an appointment/event is scheduled in the AM while a blue clock face may be useful to quickly convey that an appointment is scheduled in the PM. Clock faces may normally be colored green, indicating that the current time and general conditions (e.g., route, expected traffic, etc.) for traveling to a particular appointment permit an on-time arrival. However, as an appointment time gets closer to the current time, or appointments get scheduled closer to one another, the color of the clock faces depicting such appointments may vary from green to another color (e.g., amber) to indicate that it may be difficult to arrive at the appointments at the scheduled times. Similarly, the color of the clock faces depicting such appointments may turn to a color such as red when an appointment time has passed, or when it is no longer possible to make it to an appointment at the scheduled time. In still other embodiments, as discussed in more detail below, an event location 702 represented with an analog clock face may also quickly convey information about the particular event/appointment scheduled for the designated location, such as the person with whom the appointment is to take place.

Figure 8:
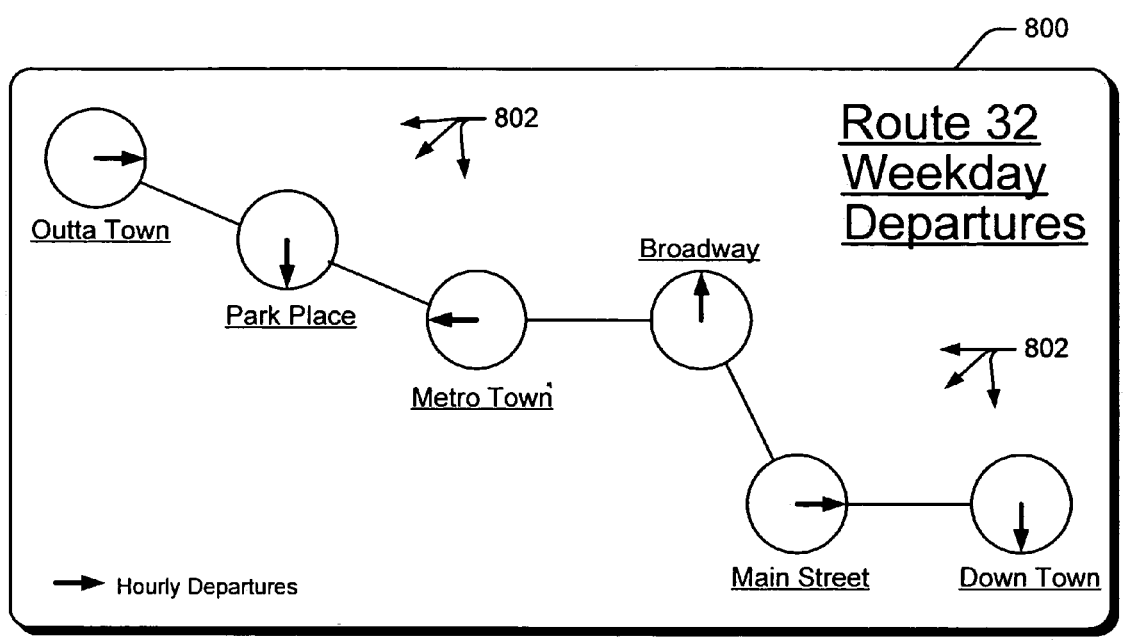
FIG. 8 illustrates another exemplary integrated spatial view of event times and locations using analog clock faces.

FIG. 8 illustrates another useful implementation of analog clock faces used to provide an integrated view of event times and event locations. FIG. 8 illustrates a departure schedule 800 for a mass transportation system route, such as, for example, a bus route or a train route. The events 802 shown as simplified analog clock faces, therefore, illustrate both the departure locations (e.g., particular bus stops along a bus route) and the departure times for buses on a bus route, for example. Each analog clock face (i.e., events 802) illustrates a time each hour when a bus is scheduled to depart from the designated location. For example, a bus should depart from the "Outta Town" bus stop at 15 minutes past each hour. The bus then departs the "Park Place" bus stop at 30 minutes past each hour, and so on. This feature can provide significant advantages in simplifying mass transit scheduling such as printed bus routes that require a user to search through tables to match times, bus routes, and departure locations.

In addition to simply showing single event times and locations, analog clock faces can also be used to depict multiple events and/or additional information about a particular event scheduled to occur at the designated event location.

Figure 9:
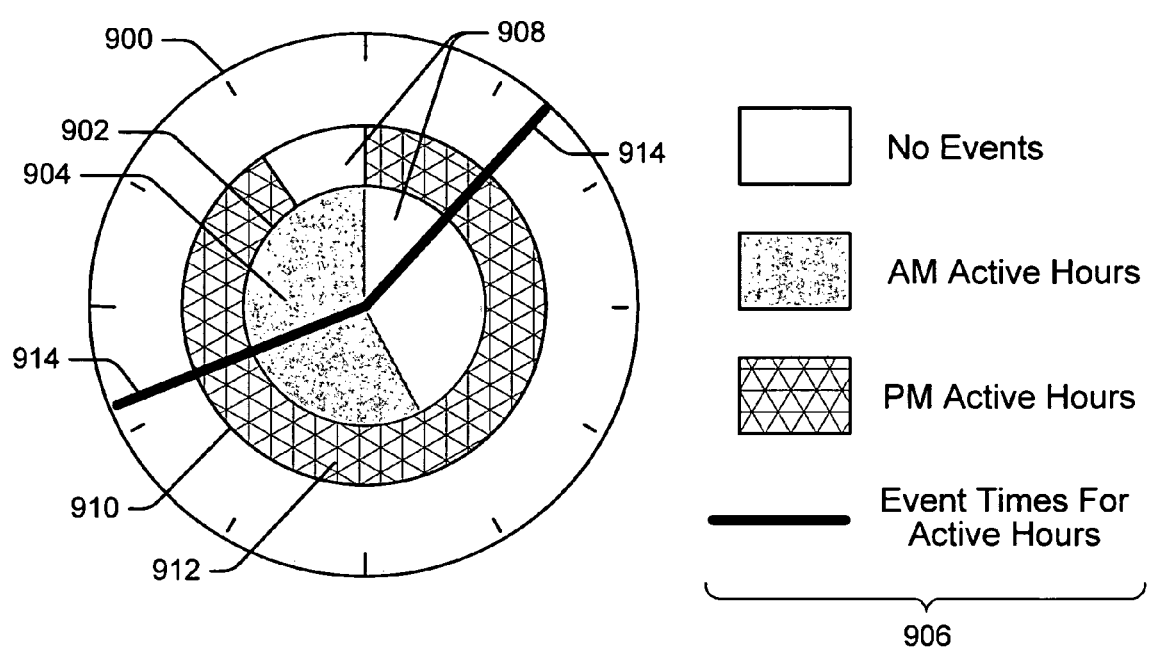
FIG. 9 illustrates an exemplary analog clock face that indicates times for multiple events.

FIG. 9 illustrates an example of a more complex analog clock face 900 that provides an integrated view of multiple events and their scheduled times. Note that a more complex analog clock face 900 may also be used in the previous examples discussed above with respect to FIGS. 7 and 8. In general, the analog clock face illustrated in FIG. 9 might be useful to represent, for example, a portion of a bus or train schedule wherein the multiple events are departure times for the buses or trains from a particular station. Clock face 900 includes an inner AM circle 902 that indicates active AM hours during which events (e.g., departures) may occur. The active AM hours 904 are indicated by the light grey area 904 of the inner circle 902, as shown by the legend 906. Inactive AM hours 908 are indicated by the white areas 908 within the inner circle 902. It is noted that inactive and active areas of the clock may be delineated in any suitable fashion, such as by color, hash marks, and so on. Furthermore, throughout this discussion of analog clock faces, a color and a hash mark are used in combination as a way of delineating between sections of clock faces in order to facilitate the discussion while avoiding a need for full color illustrations of the analog clock faces. Referring again to the clock face 900 of FIG. 9, the light grey area 904 of the inner circle 902 indicates that active AM hours 904 are from 5 AM to 12 noon. Inactive hours 908 are from 12 AM to 5 AM as shown by the white area 908 within the inner circle 902.

The clock face 900 also includes a PM ring 910 around the inner AM circle 902 that indicates active PM hours in which events can occur. The active PM hours 912 are indicated by the hashed area 912 of the ring 910, as shown by the legend 906. Inactive PM hours 908 are indicated by the white areas 908 within the PM ring 910. The hashed area 912 of the PM ring 910 indicates that active PM hours 912 are from 12 noon to 11 PM, while the white area 908 indicates that the inactive PM hours 908 are from 11 PM to midnight.

The clock face 900 also includes two event time indicator hands 914. There could be any number of event time hands 914 on the clock face 900. The event time hands 914 indicate the minutes within an hour that events are scheduled to occur. Events will occur beginning on those minutes that are indicated by the event time hands 914 for every active AM hour 904 and every active PM hour 912. The event time hands 914 of clock face 900 indicate that events are scheduled to occur during active hours, at 7 minutes past the hour and at 42 minutes past the hour. Events will not occur at those times during inactive hours.

Figure 10:
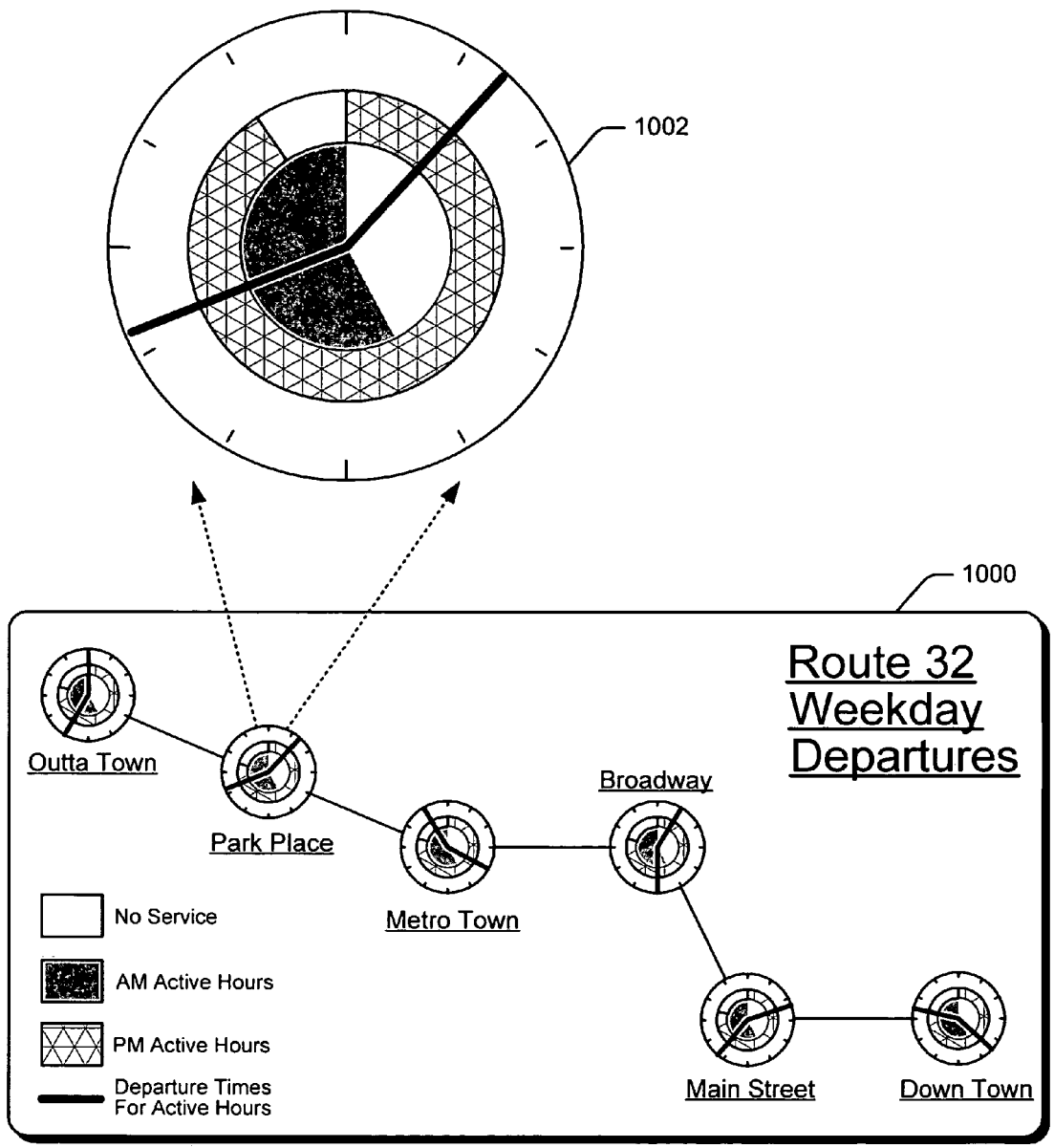
FIG. 10 illustrates an exemplary integrated spatial view of an event/departure schedule that employs an analog clock face to depict multiple events/departures at corresponding event/departure locations.
Figure 11:
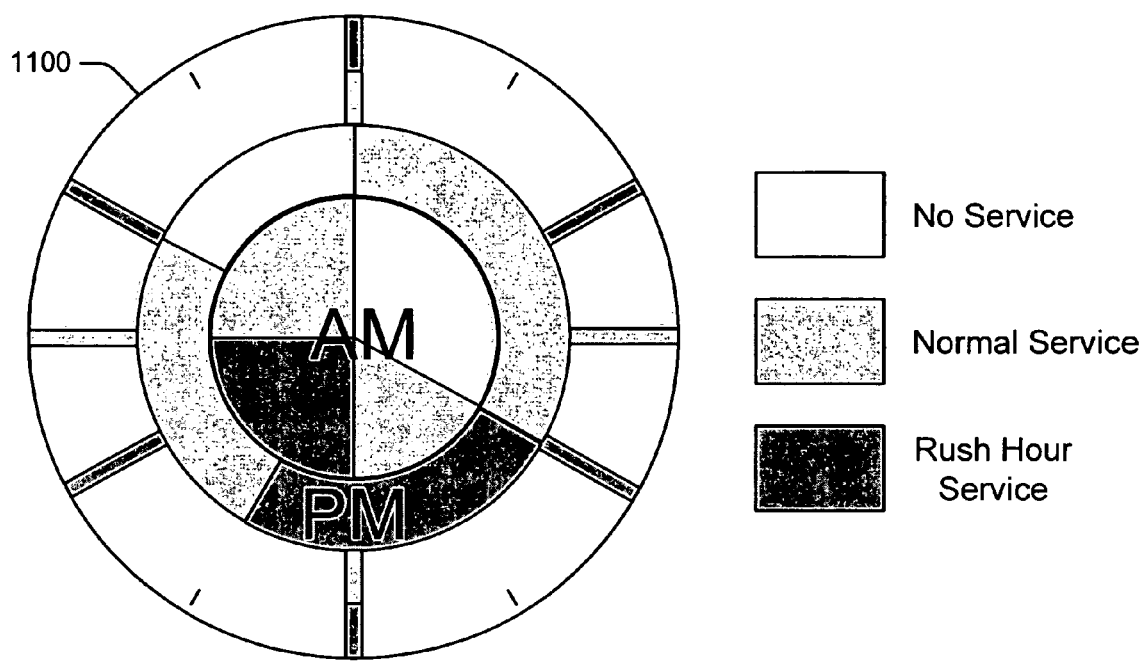
FIG. 11 illustrates an exemplary analog clock face used to indicate bus departure times along an example bus route that has both rush hour and normal service departure times.

FIG. 10 illustrates a departure schedule (e.g., for a bus route or other mass transit route) that employs a more complex analog clock face, such as the analog clock face 900 of FIG. 9, to depict multiple events/departures at each event/departure location. Each bus stop along the bus route (e.g., Route 32) of FIG. 10 includes a sign 1000 that shows the whole route (e.g., Route 32) as well as an analog clock face with departure times (i.e., "event times") that are specific to that bus stop. For example, FIG. 10 includes an enlarged image of analog clock face 1002 associated with the "Park Place" bus stop of Route 32. The clock face 1002 is configured in the same manner as the clock face 900 of FIG. 9. It is therefore apparent that for the Weekday Departure schedule of Route 32, the Park Place bus stop has buses departing two times each hour during active hours of service. The active AM hours are from 5 AM to 12 noon, while the active PM hours are from 12 noon to 11 PM. During these active hours, buses depart at 7 minutes past the hour and 42 minutes past the hour. There are many variations regarding the analog clock face 900 of FIG. 9 that are useful in different scenarios. For example, FIG. 11 illustrates an analog clock face 1100 used to indicate bus departure times on an example Bus Route 66 which has both rush hour (shaded in dark grey) and normal (shaded in light grey) service departures. Note that in this example, the departure hands (i.e., minute hands) do not extend into the center of the clock face, but remain in an outer section of the clock face. Note also, that the AM and PM sections of the clock are indicated directly with "AM" and "PM" printed directly on the clock face 1000. The clock face 1000 indicates that AM rush hour service is from 6 AM to 9 AM. Normal AM service is from 4 AM to 6 AM and from 9 AM to 12 noon. PM rush hour service is from 4 PM to 7 PM and normal PM service is from 12 noon to 4 PM and 7 PM to 10 PM. Non-service hours are indicated as white, or blank, sections within the AM and PM sections of the clock face 1100.

The departure hands (i.e., event time hands) of the clock face 1100 are color coded to correspond with the rush hour and normal service hours. The departure hands show that during rush hour service periods, a bus departs 6 times an hour. The rush hour departures are on the hour, 10 minutes past the hour, 20 minutes past the hour, 30 minutes past the hour, 40 minutes past the hour, and 50 minutes past the hour. The departure hands show that during normal service periods, a bus departs 4 times each hour. The normal service departures are on the hour, 15 minutes past the hour, 30 minutes past the hour, and 45 minutes past the hour. Note that in certain cases the departure hands may indicate both a rush hour bus departure and a normal service bus departure. In such circumstances, the departure hands are divided into the 2 color indicators for rush hour and normal service.

Figure 12:
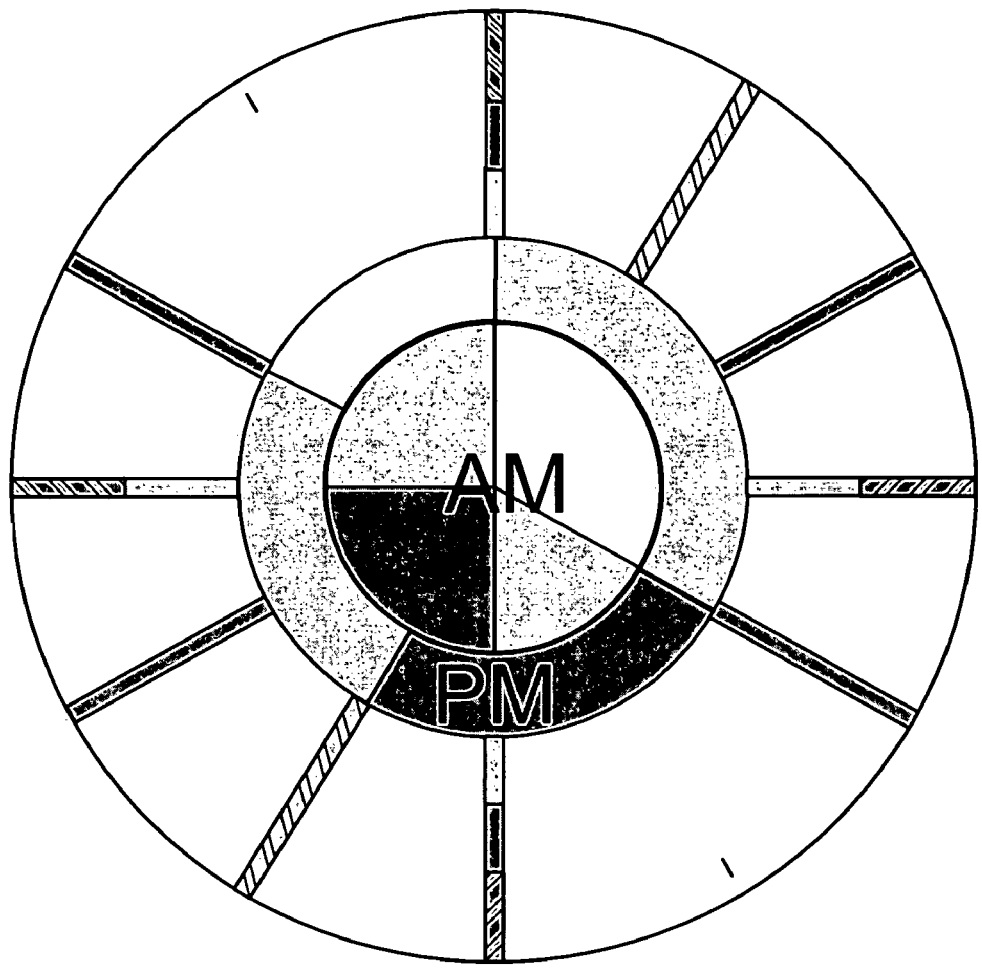
FIG. 12 illustrates an exemplary analog clock face used to indicate multiple bus departure times from a station along an example bus route that has both rush hour and normal service departure times.

FIG. 12 illustrates an analog clock face similar to the clock face 1100 of FIG. 11, except that 2 different bus routes are depicted. The description of FIG. 12 parallels the description of FIG. 11, except that the departure hands are divided into additional color and hashed indicators to account for the additional bus route departures. The departure hands (i.e., minute hands) do not extend into the center of the clock face, but remain in an outer section of the clock face. FIG. 12 indicates that buses for route 77 (generally indicated with hashed departure arms) leave during normal service hours (indicated with light grey hashed departure arms) at 5 and 35 minutes past each hour. Buses for route 77 leave during rush hour service hours (indicated with dark grey hashed departure arms) on the hour and at 15, 30, and 45 minutes past each hour. Buses for route 66 (generally indicated with non-hashed departure arms) leave during normal service hours (indicated with light grey non-hashed departure arms) on the hour and at 15, 30, and 45 minutes past each hour. Buses for route 66 leave during rush hour service hours (indicated with dark grey hashed departure arms) on the hour and at 10, 20, 30, 40, and 50 past each hour.

Figure 13:
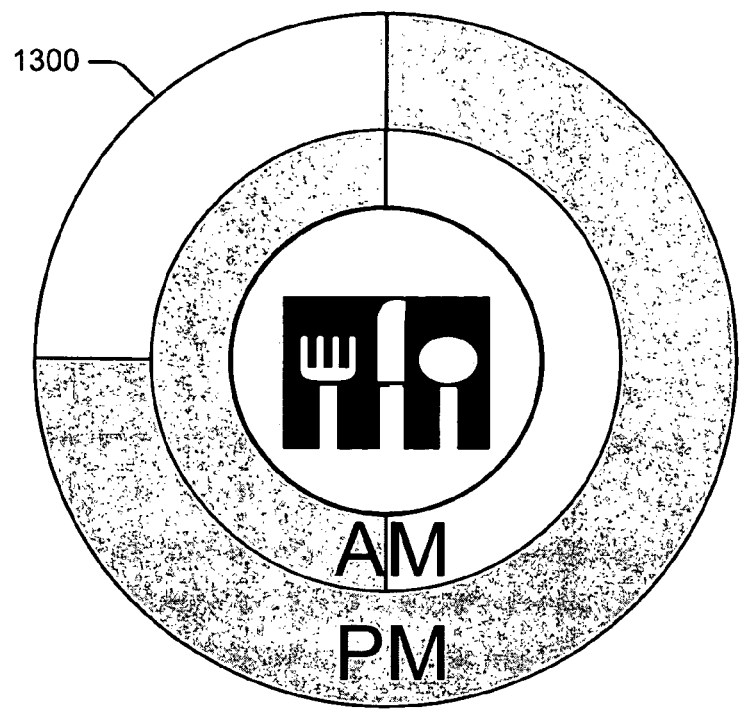
FIG. 13 illustrates an exemplary analog clock face that includes a picture icon at its center to indicate, for example, the hours of operation of a business, the schedule of an event, or the availability of an activity.
Figure 14:
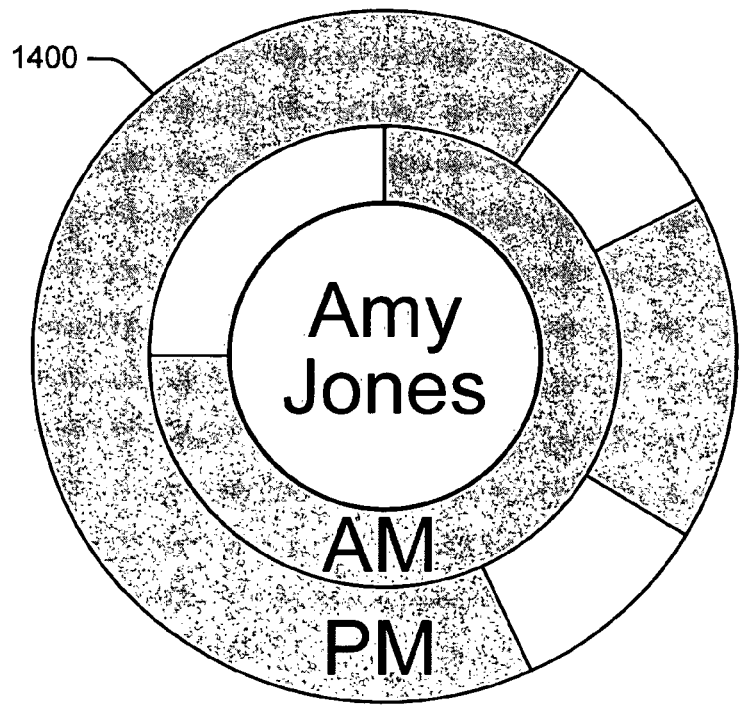
FIG. 14 illustrates an exemplary analog clock face analog clock face used as a scheduling tool.

FIGS. 13 and 14 illustrate still further examples of variations of an analog clock face such as the analog clock face 900 of FIG. 9. However, as the figures show, these example clock faces do not require minute hands as generally shown in FIG. 9 and other prior examples. The analog clock faces in FIGS. 13 and 14 provide examples that depict additional information about a particular event or activity as well as the times for the particular event or activity. For example, the analog clock face 1300 of FIG. 13 includes a picture icon of eating utensils (i.e., fork, knife and spoon) at its center, indicating that food is available (e.g., at a restaurant) during the hours of operation that are being indicated by the clock face 1300. It is apparent from the analog clock face 1300, that the hours of operation of such a restaurant are during those hours in the inner and outer clock rings that are shaded in dark grey color and designated by AM and PM hours. Thus, the AM hours during which food is available at the restaurant extend from 6 AM until 12 noon. The PM hours during which food is available extend from 12 noon until 9 PM. The non-grey areas within the inner and outer rings of analog clock face 1300 indicate times when food is not available (i.e., when the restaurant is closed). Thus, the restaurant is closed from 9 PM until 6 AM. The analog clock face 1300 of FIG. 13 quickly conveys a message that food is available from 6 AM until 9 PM.

The analog clock face 1400 of FIG. 14 illustrates an integrated spatial view of a personal schedule that depicts times when a person (e.g., Amy Jones) is unavailable and available. The analog clock face 1400 indicates AM hours within an inner clock ring and PM hours within an outer clock ring. Hours during which Amy Jones is unavailable are illustrated by blocks of time that are shaded in dark grey color, and hours during which Amy Jones is available are clear or white in color. Thus, during the AM hours, Amy is unavailable from 12 midnight until 9 AM, and she is available beginning at 9 AM and extending until 12 noon. During the PM hours, she is unavailable from 12 noon until 1 PM, which is the time when many people take a break for lunch. Amy is then available from 1 PM to 2 PM, unavailable from 2 PM to 4 PM, and available again from 4 PM to 5 PM. Starting at 5 PM, Amy is unavailable again through 12 midnight until 9 AM. The analog clock face 1400 of FIG. 14 provides an exemplary integrated spatial view that quickly conveys a personal schedule.

Exemplary Methods

Figure 16:
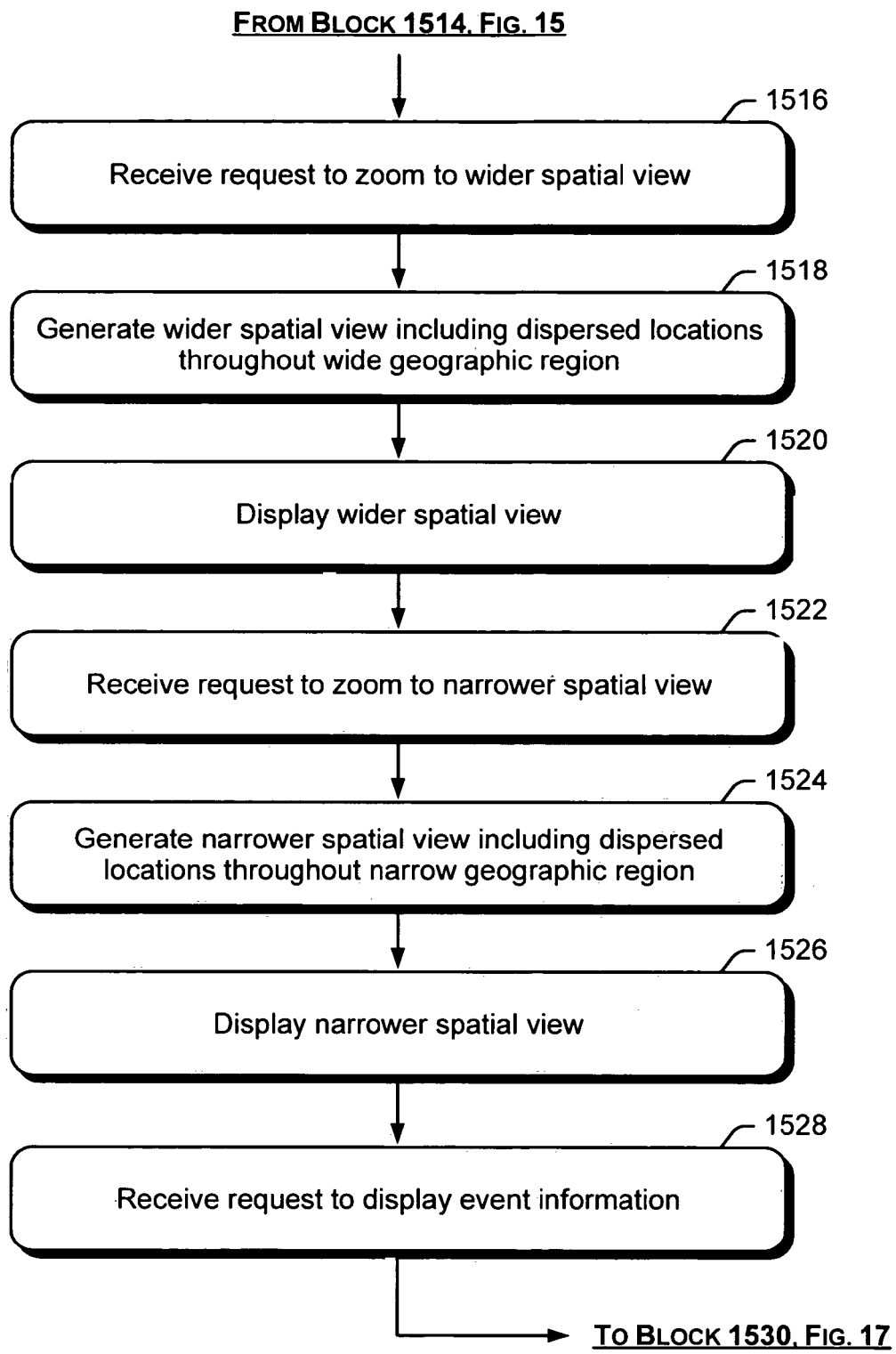
Figure 17:
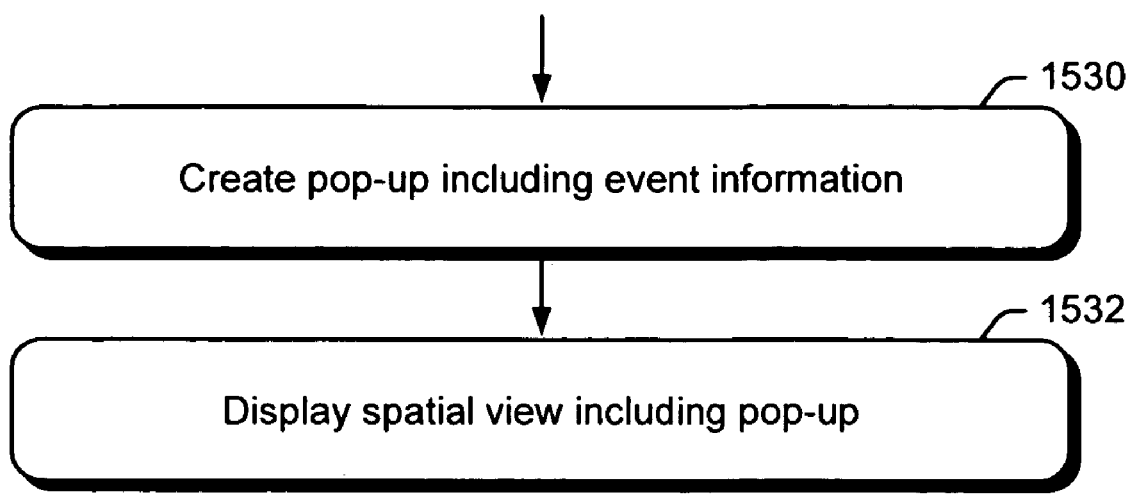

Example methods for providing an integrated spatial view of scheduling information will now be described with primary reference to the flow diagrams of FIGS. 15-17. The methods apply to the exemplary embodiments discussed above with respect to FIGS. 1-14. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 15:
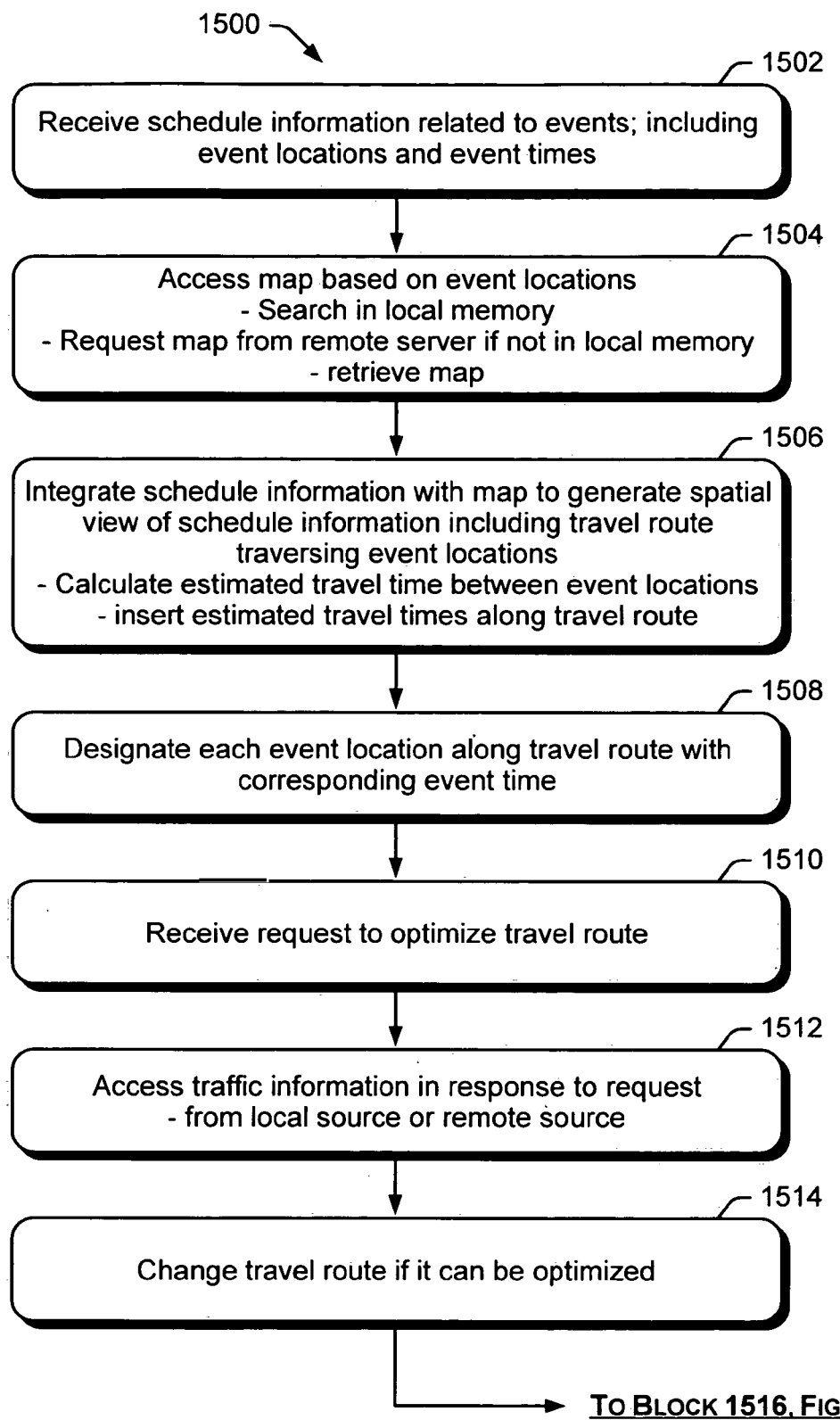
FIGS. 15-17 illustrate block diagrams of exemplary methods for providing an integrated spatial view of scheduling information.

FIG. 15 shows an exemplary method 1500 for providing an integrated spatial view of scheduling information. At block 1502, schedule information related to events is received. The information includes event locations and event times. At block 1504, a map is accessed based on the event locations. The map is accessed either from a local memory or from a remote source. At block 1506, schedule information is integrated with the map to generate a spatial view of the schedule information that includes a travel route that traverses the event locations on the map. The integration of the schedule information includes calculating estimated travel times between event locations and inserting the estimated travel times along the travel route.

At block 1508, each event location on the travel route is designated with a corresponding event time. At block 1510, a request is receive to optimize the travel route. At block 1512, traffic information is accessed in response to the request. The traffic information can be accessed from a local memory or from a remote source. At block 1514, if the travel route can be optimized based on the traffic information, the travel route is changed.

At block 1516, a request is received to zoom to a wider spatial view of the schedule information. At block 1518, a wider spatial view is generated and includes event locations dispersed throughout a wider geographic region. At block 1520, the wider spatial view is displayed. At block 1522, a request is received to zoom to a narrower spatial view. At block 1524, a narrower spatial view is generated that includes event locations dispersed throughout a narrower geographic region. At block 1526, the narrower spatial view is displayed. At block 1528, a request is receive to display event information. At block 1530, a pop-up is generated that includes the request event information. At block 1532, the spatial view is displayed including the event information in the pop-up.

While one or more methods have been disclosed by means of flow diagrams and text associated with the blocks of the flow diagrams, it is to be understood that the blocks do not necessarily have to be performed in the order in which they were presented, and that an alternative order(s) may result in similar advantages. Furthermore, the methods are not exclusive and can be performed alone or in combination with one another.

Exemplary Computer

Figure 18:
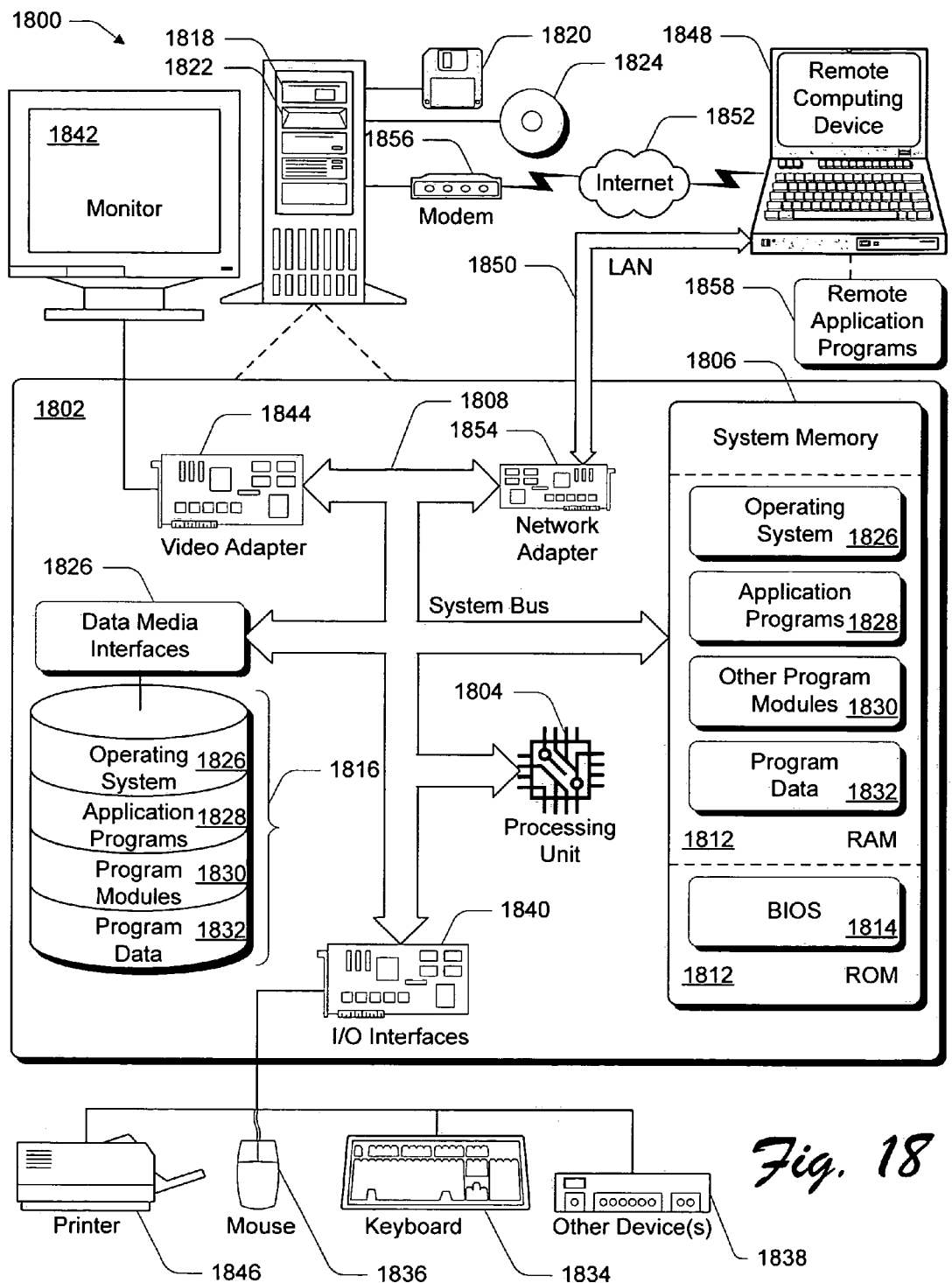
FIG. 18 illustrates an exemplary computing environment suitable for implementing a computer such as the computer in the exemplary environment of FIG. 1.

FIG. 18 illustrates an exemplary computing environment suitable for implementing a computer 102 as discussed above with reference to FIGS. 1-14. Although one specific configuration is shown in FIG. 18, computer 102 may be implemented in other computing configurations.

The computing environment 1800 includes a general-purpose computing system in the form of a computer 1802. The components of computer 1802 may include, but are not limited to, one or more processors or processing units 1804, a system memory 1806, and a system bus 1808 that couples various system components including the processor 1804 to the system memory 1806.

The system bus 1808 represents one or more of any of several types of bus structures, including a memory bus or memory controller, a peripheral bus, an accelerated graphics port, and a processor or local bus using any of a variety of bus architectures. An example of a system bus 1808 would be a Peripheral Component Interconnects (PCI) bus, also known as a Mezzanine bus.

Computer 1802 includes a variety of computer-readable media. Such media can be any available media that is accessible by computer 1802 and includes both volatile and non-volatile media, removable and non-removable media. The system memory 1806 includes computer readable media in the form of volatile memory, such as random access memory (RAM) 1810, and/or non-volatile memory, such as read only memory (ROM) 1812. A basic input/output system (BIOS) 1814, containing the basic routines that help to transfer information between elements within computer 1802, such as during start-up, is stored in ROM 1812. RAM 1810 contains data and/or program modules that are immediately accessible to and/or presently operated on by the processing unit 1804.

Computer 1802 may also include other removable/non-removable, volatile/non-volatile computer storage media. By way of example, FIG. 18 illustrates a hard disk drive 1816 for reading from and writing to a non-removable, non-volatile magnetic media (not shown), a magnetic disk drive 1818 for reading from and writing to a removable, non-volatile magnetic disk 1820 (e.g., a "floppy disk"), and an optical disk drive 1822 for reading from and/or writing to a removable, non-volatile optical disk 1824 such as a CD-ROM, DVD-ROM, or other optical media. The hard disk drive 1816, magnetic disk drive 1818, and optical disk drive 1822 are each connected to the system bus 1808 by one or more data media interfaces 1826. Alternatively, the hard disk drive 1816, magnetic disk drive 1818, and optical disk drive 1822 may be connected to the system bus 1808 by a SCSI interface (not shown).

The disk drives and their associated computer-readable media provide non-volatile storage of computer readable instructions, data structures, program modules, and other data for computer 1802. Although the example illustrates a hard disk 1816, a removable magnetic disk 1820, and a removable optical disk 1824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1816, magnetic disk 1820, optical disk 1824, ROM 1812, and/or RAM 1810, including by way of example, an operating system 1826, one or more application programs 1828, other program modules 1830, and program data 1832. Each of such operating system 1826, one or more application programs 1828, other program modules 1830, and program data 1832 (or some combination thereof) may include an embodiment of a caching scheme for user network access information.

Computer 1802 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1802 via input devices such as a keyboard 1834 and a pointing device 1836 (e.g., a "mouse"). Other input devices 1838 (not shown specifically) may include a microphone, joystick, game pad, satellite dish, serial port, scanner, and/or the like. These and other input devices are connected to the processing unit 1804 via input/output interfaces 1840 that are coupled to the system bus 1808, but may be connected by other interface and bus structures, such as a parallel port, game port, or a universal serial bus (USB).

A monitor 1842 or other type of display device may also be connected to the system bus 1808 via an interface, such as a video adapter 1844. In addition to the monitor 1842, other output peripheral devices may include components such as speakers (not shown) and a printer 1846 which can be connected to computer 1802 via the input/output interfaces 1840.

Computer 1802 may operate in a networked environment using logical connections to one or more remote computers, such as a remote computing device 1848. By way of example, the remote computing device 1848 can be a personal computer, portable computer, a server, a router, a network computer, a peer device or other common network node, and the like. The remote computing device 1848 is illustrated as a portable computer that may include many or all of the elements and features described herein relative to computer system 1802.

Logical connections between computer 1802 and the remote computer 1848 are depicted as a local area network (LAN) 1850 and a general wide area network (WAN) 1852. Such networking environments are commonplace in offices, enterprise-wide computer networks, intranets, and the Internet. When implemented in a LAN networking environment, the computer 1802 is connected to a local network 1850 via a network interface or adapter 1854. When implemented in a WAN networking environment, the computer 1802 includes a modem 1856 or other means for establishing communications over the wide network 1852. The modem 1856, which can be internal or external to computer 1802, can be connected to the system bus 1808 via the input/output interfaces 1840 or other appropriate mechanisms. It is to be appreciated that the illustrated network connections are exemplary and that other means of establishing communication link(s) between the computers 1802 and 1848 can be employed.

In a networked environment, such as that illustrated with computing environment 1800, program modules depicted relative to the computer 1802, or portions thereof, may be stored in a remote memory storage device. By way of example, remote application programs 1858 reside on a memory device of remote computer 1848. For purposes of illustration, application programs and other executable program components, such as the operating system, are illustrated herein as discrete blocks, although it is recognized that such programs and components reside at various times in different storage components of the computer system 1802, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable medium comprising processor-executable instructions that, when executed on one or more processors, perform acts comprising:

receiving scheduling information including event times, event locations, and event details;

accessing a map that encompasses the event locations for each event location, expressing event times in a single illustrated clock face, wherein the expressing event times comprises:

expressing AM hours in which an event can occur as an inner circle partitioned into an AM event-on section and an AM event-off section;

expressing PM hours in which an event can occur as a first ring surrounding the inner circle, the first ring partitioned into a PM event-on section and a PM event-off section;

expressing an event time as a clock hand extending radially away from the center of the inner circle in a direction which expresses a particular minute in an analog clock hour;

wherein the event occurs at the particular minute for every hour of the AM event-on section and every hour of the PM event-on section;

displaying each clock face on the map at its corresponding event location;

receiving a user input instruction from a cursor hovering over an event time in the single spatial view; and in response to the user input instruction, displaying a pop-up pane containing underlying event information associated with the event time.

2. A processor-readable medium comprising processor-executable instructions that, when executed on one or more processors, perform acts comprising:

expressing multiple event times of at least two events on a single analog clock face;

wherein the clock face includes an inner circle depicting active AM hours in which event times may occur for the at least two events, a first concentric ring around the inner circle depicting active PM hours in which event times may occur, a second concentric ring around the first concentric ring, the second concentric ring depicting time markings consistent with an analog clock, and event hands extending toward the center of the inner circle from the outer edge of the second concentric ring to the inner edge of the second concentric ring, each event hand designating a particular minute in an analog clock hour when an event of the at least two events will occur for every active AM hour and for every active PM hour;

wherein the event hands are divided into at least two indicators when at least two events occur at an identical particular minute.

3. A processor readable medium as recited in claim 2, further comprising displaying a plurality of the clock faces on a map, each clock face displayed at a different location to form a route on the map.

4. A processor readable medium as recited in claim 2, further comprising:

receiving scheduling information including event times, event information, and event locations;

accessing a map based on the event locations;

integrating the event times, event information, and event locations into a schedule route on the map;

designating each event location with an analog clock face that depicts an event time corresponding to the event location; and displaying the schedule route on the map in a single spatial view.

5. A processor readable medium as recited in claim 4, further comprising:

receiving a user input instruction from a cursor hovering over an event time in the single spatial view; and in response to the user input instruction, displaying a pop-up pane containing underlying event information associated with the event time.

6. A processor readable medium as recited in claim 5, further comprising:

receiving user input through the pop-up pane that includes altered event information selected from the group comprising:

edited event information;
added event information; and
deleted event information.

7. A processor readable medium as recited in claim 6, further comprising:

transferring the altered event information from the single spatial view of the scheduling information to a calendar view of the scheduling information.

8. A processor readable medium as recited in claim 6, wherein the event locations can include local, regional, national, and international locations, the method further comprising:

zooming the single spatial view between a local view, a regional view, a national view, and an international view according to a user input instruction;

wherein each of the local view, regional view, national view, and international view include relevant event times, event information, and event locations.

9. A computer system for scheduling and displaying event information, the system comprising:

one or more processors; and a processor-readable medium comprising processor-executable instructions that, when executed on the one or more processors, perform acts comprising:

receiving scheduling information including event times, event locations, and event details;

accessing a map that encompasses the event locations for each event location, expressing event times in a single illustrated clock face, wherein the expressing event times comprises:

expressing AM hours in which an event can occur as an inner circle partitioned into an AM event-on section and an AM event-off section;

expressing PM hours in which an event can occur as a first ring surrounding the inner circle, the first ring partitioned into a PM event-on section and a PM event-off section;

expressing an event time as a clock hand extending radially away from the center of the inner circle in a direction which expresses a particular minute in an analog clock hour;

wherein the event occurs at the particular minute for every hour of the AM event-on section and every hour of the PM event-on section;

displaying each clock face on the map at its corresponding event location;

receiving a user input instruction from a cursor hovering over an event time in the single spatial view; and in response to the user input instruction, displaying a pop-up pane containing underlying event information associated with the event time.

* * * * *